United States Patent

[11] 3,589,811

[72] Inventor Michel Berger
Saint-Lambert des Bois, France
[21] Appl. No. 782,942
[22] Filed Dec. 11, 1968
[45] Patented June 29, 1971
[73] Assignee Memo International Establishment
Vaduz, Liechtenstein
[32] Priority Jan. 19, 1968
[33] Switzerland
[31] 858/68

[54] APPARATUS FOR SPLITTING UP A POLYCHROMATIC LIGHT BEAM INTO THREE COMPONENT MONOCHROMATIC BEAMS

16 Claims, 6 Drawing Figs.

[52] U.S. Cl. .......... 355/32, 95/12.20, 350/311, 355/35
[51] Int. Cl. .......... G03b 27/76
[50] Field of Search .......... 355/32, 35; 95/12.20; 350/311

[56] References Cited

UNITED STATES PATENTS

| | | | |
|---|---|---|---|
| 1,238,775 | 9/1917 | Ives .......... | 95/12.20 |
| 2,286,526 | 6/1942 | Wright .......... | 95/12.20 X |
| 2,373,936 | 4/1945 | Wright .......... | 95/12.20 |

*Primary Examiner*—Samuel S. Matthews
*Assistant Examiner*—Richard A. Wintercorn
*Attorney*—Harness, Dickey and Pierce

ABSTRACT: In the production of three monochromatic images on photosensitive surfaces by splitting up a polychromatic light beam into three component monochromatic beams, a nondeformable compact optical unit is provided having two dichroic filters arranged in cross formation for splitting up the polychromatic beam into three monochromatic beams each directed upon one sensitive surface in front of which an interference filter is arranged. The polychromatic beam is split up by the dichroic filters by dividing the visible spectrum thereof into three passbands situated tangent to one another without mutual overlap.

Figure 1:
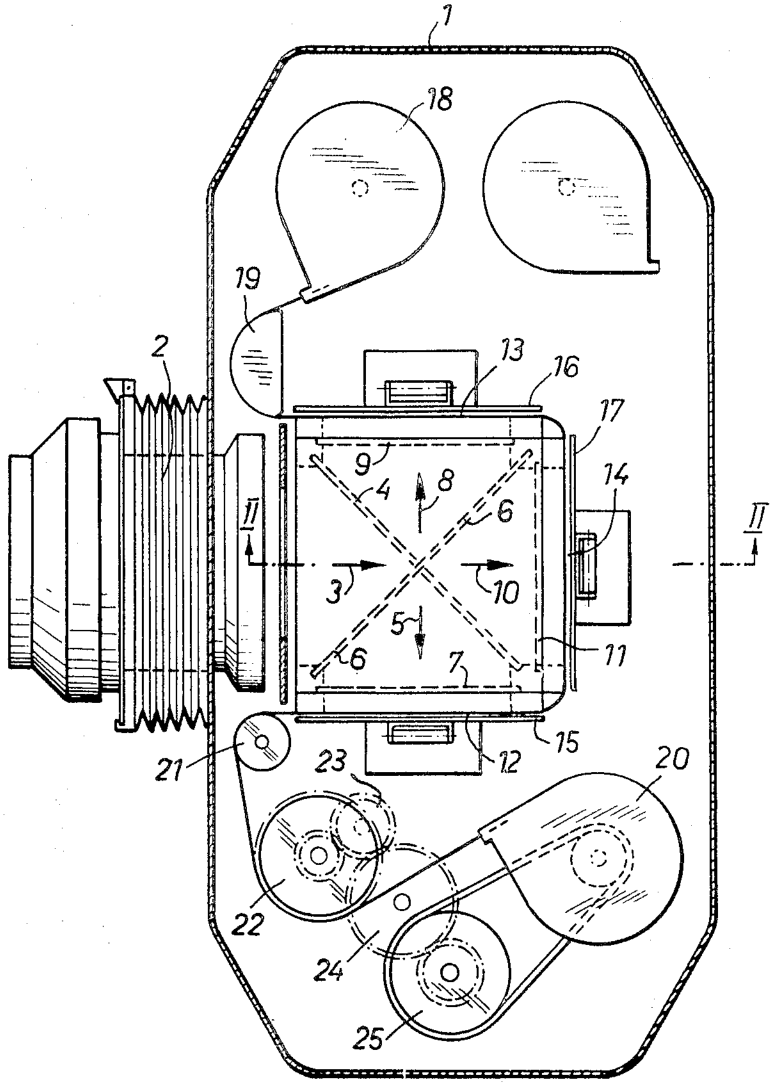

INVENTOR.
Michel Berger
BY
Harness, Dickey & Pierce
ATTORNEYS.

INVENTOR.
Michel Berger
BY
Harness, Dickey & Pierce
ATTORNEYS

INVENTOR.
Michel Berger
BY
Harness, Dickey & Pierce
ATTORNEYS

APPARATUS FOR SPLITTING UP A POLYCHROMATIC LIGHT BEAM INTO THREE COMPONENT MONOCHROMATIC BEAMS

The present invention relates to a method for simultaneously splitting a polychromatic light beam into at least three monochromatic components for forming images on photosensitive surfaces, in which at least three dichroic filters are provided for splitting this polychromatic light beam into the three separate monochromatic beams, and an interferential filter being positioned in front of each photosensitive surface in the path of a respective one of the monochromatic light beams; the present invention further relates to an apparatus for carrying out this method. The method according to this invention is applicable to all the known processes of color printing, particularly offset color printing, heliography and typography on the basis of the three images obtained on the photosensitive surfaces.

Optical devices are known which serve to divide a polychromatic light ray into two or three monochromatic rays. British Pat. No. 873,833 describes an arrangement which is constituted by a block of transparent material consisting of at least two prisms whose surfaces are in mutual contact, a layer of dichroic material being placed at at least one of the interfaces between two prisms. This patent refers to other arrangements of which one consists of four prisms forming two dichroic filters. The idea underlying this known arrangements lies in the block formed by these prisms, whose interfaces are suitably treated and carry a layer of dichroic material which is capable of reflecting the light of one color. The blocks of transparent material thus formed are intended to equip color television cameras.

British Pat. No. 759,063 describes optical systems which are intended for use in photography and in color television. The optical systems described consist of assemblies of prisms whose interfaces also carry dichroic layers. These optical interference layers have refractive indices which are different one from another and which are selected in such a manner as to compensate the difference in sensitivity of the photosensitive surfaces employed.

U.S. Pat. No. 2,808,456 describes a system serving to split up light rays for color television and in particular is intended to convert a light ray obtained from a color film image into three monochromatic beams which are to be directed onto the photosensitive receiver tubes.

French Pat. Nos. 1,204,363 and 1,270,024 also relate to color television cameras which utilize three image-dissector tubes. A set of dichroic filters and of total reflecting mirrors are arranged in a suitable manner to apply each of the three monochromatic beams (blue, red and green) to its associated image-dissector tube.

The present invention has the object of obtaining on a photosensitive surface three monochromatic images which are perfectly balanced, so that a polychromatic image of high quality can be obtained when these monochromatic images have been fixed without the necessity of any retouching.

The method according to the invention comprises splitting up the polychromatic light beam by dividing the visible band of the spectrum of this beam into three passbands of balanced transmission situated tangent to one another without mutual overlap.

The apparatus according to the invention for carrying out the method of simultaneously producing three monochromatic images on photosensitive surfaces comprises two dichroic filters to split a polychromatic beam into three component monochromatic beams, three interference filters, each of which is placed in front of an associated photosensitive surface on which an image is to be formed by one of the monochromatic beams, an optical and image-recording portion formed by a homogeneous, nondeformable unit including means for positioning the different filters, and means for subjecting the filters to constant pressure, said filters being positioned with an accuracy of the order of a micron.

Figure 2:
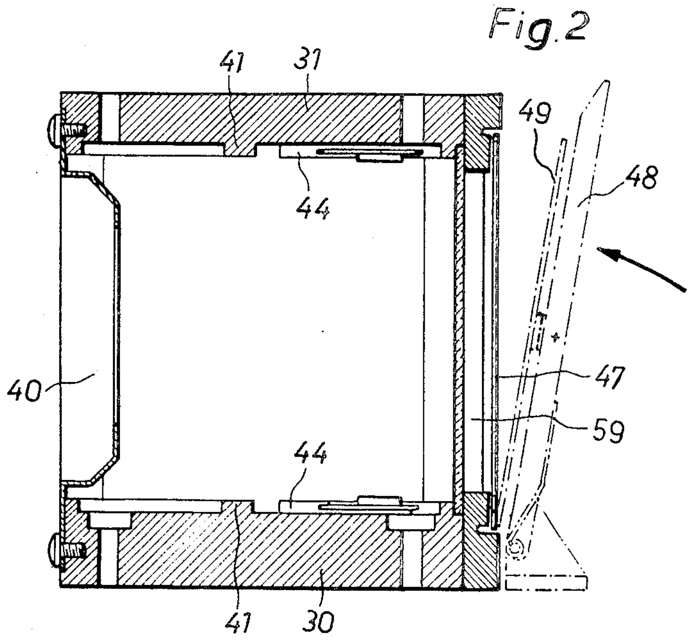
Figure 3:
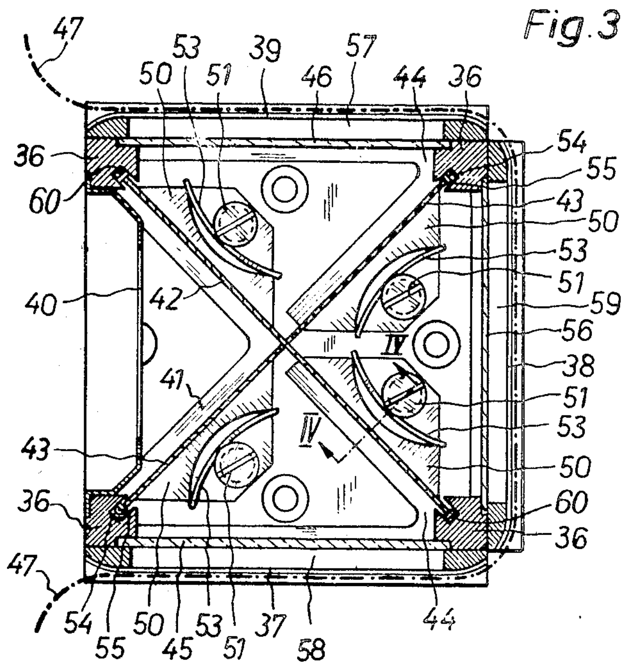
Figure 4:
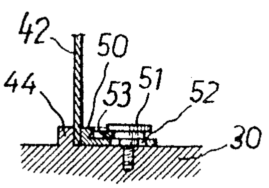
Figure 5:
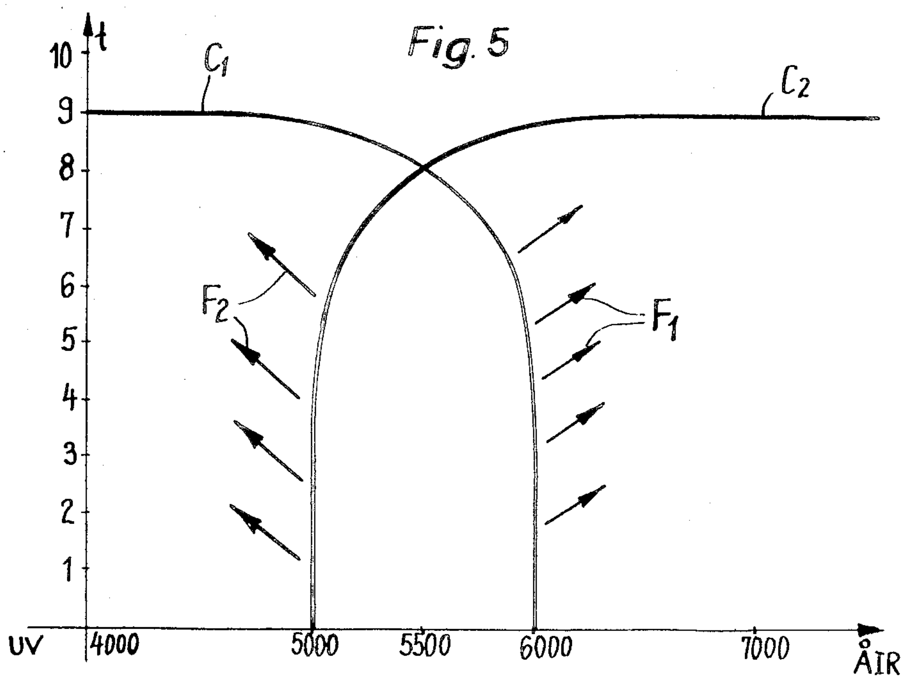

The invention will now be explained with reference to the accompanying drawings, in which:

FIG. 1 is a diagrammatic view partly drawn in section of one form of apparatus for carrying out the method according to the invention, FIG. 2 is a vertical sectional view taken through the optical unit or beam-splitting chamber, taken along the line II–II of FIG. 1, FIG. 3 is a horizontal sectional view taken through the optical unit shown in FIG. 1, FIG. 4 shows a detail in section along the line IV–IV of FIG. 3, FIG. 5 shows the reflection curves of two dichroic filters as a function of the wavelength.

Figure 6:
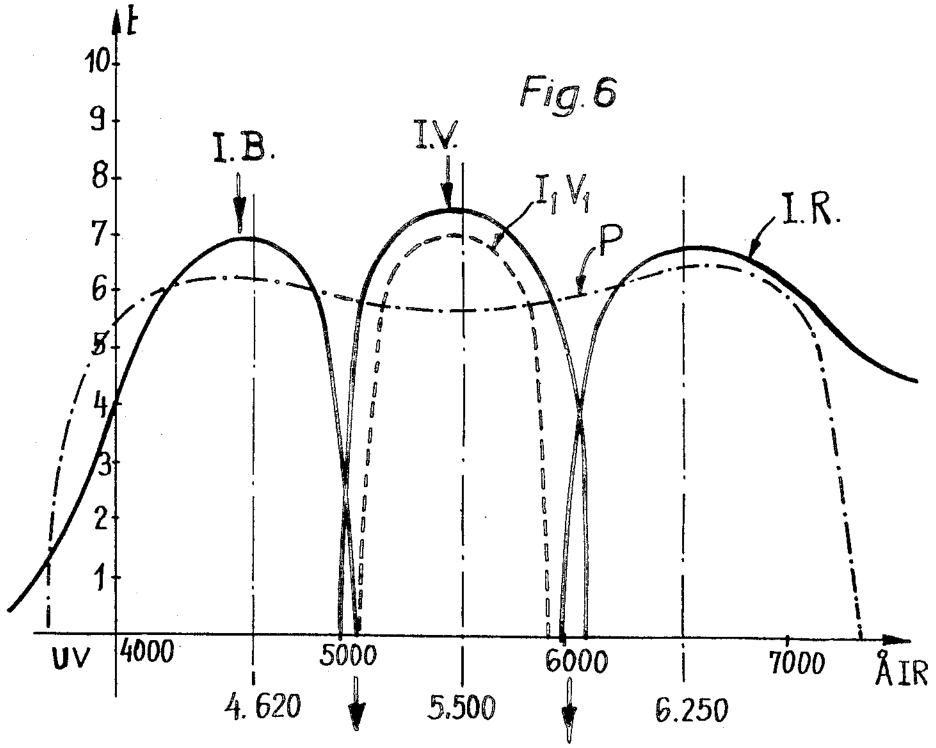

FIG. 6 shows the three monochromatic transmission curves after the monochromatic beams have crossed the interferential filters.

The apparatus shown in FIG. 1 comprises a casing 1 on which an objective 2 is fixed, this objective 2 comprising a diaphragm and a shutter which are not shown. The polychromatic light beam passing through the objective 2 emerges at 3 and strikes a first dichroic filter 4 which reflects part of the spectrum—that is to say the red part of the spectrum—along the axis 5 and passes the blue and green radiations. The red component contained in the lower part of the light beam which first of all strikes the dichroic filter 6—which is constituted by two parts which are positioned perpendicularly of, and to either side of, the dichroic filter 4, so that the filters 4 and 6 define a cross—is not stopped by this filter 6 because the said filter is a dichroic filter which reflects the blues. All the red radiations are reflected in the form of a monochromatic beam along the axis 5, the red monochromatic beam then passing through an interferential filter 7.

The dichroic filter 6 reflects the blue components along the optical axis 8 and the blue monochromatic beam passes through the interferential filter 9. After it has passed through the dichroic filters 4 and 6, the polychromatic beam only contains the green components of the spectrum, as the red and blue components have been reflected along the optical axes 5 and 8.

The green monochromatic beam or ray leaves the beam-splitting chamber or optical unit along the optical axis 10, and passes through the interferential filter 11. The red, blue and green monochromatic beams passing through the beam-splitting chamber, which is constituted by the two dichroic filters 4 and 6, along the optical axes 5, 8 and 10 impinge upon—after they have passed through the interferential filters 7, 9 and 11—a sensitive film which is wound round the beam-splitting chamber at 12, 13 and 14. The sensitive film is pressed against the walls of the beam-splitting chamber or optical unit by means of film-presser elements 15, 16 and 17. The film is a black-and-white film which is unwound from a feed spool 18, engages the surface of a support 19, and then passes round the sides of the beam-splitting chamber; this film is then wound up on a receiving spool 20. The apparatus further includes a guide roller 21 and a drive roller 22, also a set of wheels 23, 24 and 25 which serve to drive the spindle of the spool 20.

The beam-splitting chamber accommodating the dichroic filters 4 and 6 will be described in greater detail with reference to FIGS. 2, 3 and 4. This chamber is constructed in such a manner that it can carry the sensitive film, the accuracy of the path described by this film being controlled to the accuracy of the order of a micron. The beam-splitting chamber which comprises the filter, the film-presser device and the film-guide track constitutes a homogeneous, nondeformable optical unit. A mechanical system enables the different filters to be positioned and to be subject to a constant pressure with an accuracy which is of the order of a micron.

The optical unit shown in FIGS. 2, 3 and 4 is constituted by a bottom wall element 30 and by an upper cover element 31 which are spaced from one another by four upright columns 36. The three side surface 37, 38 and 39 cooperates to form a film track. All these parts are made of specially age-hardened optical steel which, under thermal stress, is subject to the same expansion and contraction as the special glass of the filters used. The face of the beam-splitting chamber which does not comprise an interferential filter, and by which the polychromatic beam enters, is provided with a mask 40 which serves to restrict the optical beam to specific sections, so that this beam, after it has been split up, will only cover the respective image surfaces of each monochromatic beam, and no overlap of the images will occur.

As has already been mentioned, the whole of this assembly has an accuracy of the order of 1 micron. In order to achieve this result the surfaces of all of the parts are finished to the accuracy of 1 micron, and the two bottom and top cover plates 30 and 31 are arranged to be perfectly parallel. The margin of error does not exceed 1 micron. These plates 30 and 31 comprise guides 41 which are machined in the material of the said plates 30 and 31 so as to form raised portions of increased thickness, this machining being controlled to an accuracy of 1 micron. The guides 41 serve as a support for the dichroic filters 42 and 43 and are of V-shape (FIG. 3). It is clear that these guides are aligned in perfect symmetry with respect to one another, and that the accuracy is maintained to within a tolerance of 1 micron. The bottom and top cover plates also comprise two angle elements 44 against which abut, firstly, the dichroic filters 42 and 43 and, secondly, two of the interferential filters 45 and 46. One of the notable aspects of novelty of this mechanical arrangement resides in the fact that the outer surface of the block defines the film track, in which the film 47 is guided with strict accuracy and in which the three planes in which the three monochromatic images are formed lie at the same distance (to within an accuracy of 1 micron) from the optical center; in this way it is ensured from a mechanical point of view that the three images formed will be identical with one another, an analogous result also being realized from the optical point of view within an accuracy of 1 micron. A door 48 which comprises a film-presser element 49 applies pressure to the film 47 so as to keep the latter in flat condition, this pressure being rigorously the same for the image planes of the three monochromatic images.

A further novelty of the optical assembly and of the mechanical construction of the beam-splitting chamber is the system whereby the dichroic filters 42 and 43 are held in a cross formation, the arms of the cross including an angle of 90° with one another and the accuracy of this cross formation being held to within 1 micron. One of the two dichroic filters 42, 43 (in this case the red reflector, that is to say the blue-green filter 42) is formed as a single piece, whereas the other filter 43 (the blue reflector, that is to say the yellow-orange filter) is composed of two parts which are indicated by the reference numeral 43 in FIGS. 2 and 3.

The filters 42 and 43 are first mounted on the lower plate 30 against the guides 41 and 44 (FIG. 3) where they are held in position by the elements 50 which are fixed to the plate 30 by means of wide-head screws 51. A hole 52 which is larger than the shank of screw 51 is drilled in each element 50. In such manner that this element is capable of movement in the direction of the thrust which is to be exercised on the filters. A region of increased thickness in this element 50 enables a leaf spring 53, which abuts against the screw, to exert a constant pressure on the filters.

When the four upright columns 36 are fixed to the lower cover plate, the two dichroic half filters 43 (blue reflector) are slid into position and are mounted in the same way on the lower cover plate 30 subject to the pressure exerted by the thrust elements 50. The latter pressure which is necessary to enable the two half filters to bear without deformation against the single filter 42, which has been previously assembled, is exerted by leaf springs 54 which are slid into the slots 55 formed in the upright columns 36. It should be pointed out that the red-reflecting filter 42 has been centered as a preliminary measure in the upright columns 36 by means of spacing blocks 60.

When the filters have been assembled, the upper cover plate 31 which has the same symmetrically arranged elements for supporting the filters as the bottom plate 30 is placed in position on the upright columns 36. As a preliminary measure, the springs 53 are removed so that the elements for exerting the pressure on the filters will be loose. The cover plate 31 is then partially screwed onto the upright columns 36, and the whole assembly of the beam-splitting chamber is placed in a squaring block in which, by the exercise of pressure, two of the four faces of each plate 30 and 31 will lie flush with the upright columns. As this squaring block and also the sides of the cover plates 30 and 31 are treated to ensure that they have an accuracy of the order of a micron—and as these plates 30 and 31 are strictly symmetrical with one another—it only remains to finally tighten the securing screws (not shown) of the upper cover plate 31 so as to obtain a perfectly symmetrical arrangement of the abutment surfaces lying against the filters. When this assembly is completed the accuracy will be of the order of 1 micron. The compression springs 53 of the upper cover plate 31 are then placed in position, and the assembly of the optical unit will be completed. The interferential filters 45, 46 and 56 are placed in position when the film tracks 57, 58 and 59 are fixed, expansion joints (not shown) also being assembled at this time. The expansion joints are provided in the form of liquid rubber pressed into interstices provided upon assembly. The interferential filters are then pressed between the upright columns 36 and the film tracks (slides) 57, 58 and 59.

As the film tracks 57, 58 and 59 form an integral unit with the beam-splitting chamber, the film is held securely the flat within the tracks, the latter being machined to an accuracy of 1 micron. In this way it is possible to ensure that the three negative images will be geometrically and optically identical; owing to a careful selection of filters it is also possible to ensure that the images will have the same images density and will have strict chromatic selectivity. The optical considerations underlying this careful choice of the films will be explained below with reference to FIGS. 5 and 6.

By way of example, the following are details and references of the filters employed in the photographic apparatus, with provision for direct division into three monochromatic beams, constructed according to the embodiment which has just been described.

The blue-green, dichroic filter (reflecting the red radiation) is a K.I.F. schott filter, 65×80.8 (thickness 0.8 mm.).

The orange dichroic filter (reflecting the blue radiation) is an L.I.F. schott filter, 65×40 (thickness 0.8 mm.).

The red interferential filter is a schott filter, reference M.B., interference 6250, transmission R.G. 610.

The green inferential filter is a schott filter, reference M.B., interference 5500, transmission V.G. 14.

The blue interferential filter is a schott filter, reference M.B., interference 4620, transmissions B.G. 25.

The wavelengths at maximum transmission which are shown are referred to in FIG. 6. The figures which indicate these wavelengths will be explained below. All these filters are appropriately treated, are multilayered, and are antireflective on all their faces. Their edges are painted in dull black and their thickness is controlled to the accuracy of a micron.

The three images which are obtained with the apparatus described above are identical and are strictly selective, so that it suffices to enlarge them and to screen them, in accordance with conventional printing procedures, so as to obtain directly and by means of offset printing, heliography, typography or by electronic printing methods, high-quality color printed images. The inks employed for printing should, if possible, correspond to the DIN standards, the filters having been selected bearing these DIN standards in mind.

In this way it is possible, at the printing stage, to dispense with all the methods of manual or electronic retouching which are conventionally made; similarly, it is possible to dispense with masks and countermasks and it is frequently possible to dispense with the black master which it is sometimes necessary to provide when making a color print.

It is clear that the beam-splitting chamber described with reference to FIGS. 2 and 3 can be mounted in a television camera. The film on which an image is formed by the three monochromatic beams will then be replaced by three tubes, for example plumbicone-type tubes which receive three images. These latter are so well balanced and so dimensionally alike that it is possible to dispense with the whole electronic stage comprising means for effecting chromatic corrections, the image finally obtained in the receiver having a much wider range of color spectrum and of density.

FIGS. 5 and 6 shall now be explained. It has already been mentioned that the combination of the various filters of which the beam-splitting chamber is composed enables the visible light spectrum to be split up into three passbands which lie tangent to one another, without mutual overlap, and are of balanced transmission.

As already explained in connection with the description of FIG. 1, the primary division of the polychromatic optical beam which forms the image is effected into three secondary monochromatic beams through the intermediary of an optical cross constituted by dichroic filters which are selected as thin as possible (from 0.3 to 0.8 mm. as a maximum). The dichroic layer by means of which the division of the polychromatic beam into monochromatic beams is possible is placed on that face of the filter on which the polychromatic beam impinges. The primary polychromatic beam carries an image whose chromaticity covers the whole of the visible spectrum including infrared and ultraviolet radiation, while each of the three secondary beams occupies a more restricted area of the spectrum (between ½ and a ⅓ of the width of the visible spectrum lying between 4,000 and 7,000 A.).

The process of filtering the polychromatic beam is explained in FIG. 5 in which the three secondary monochromatic beam are represented by surface areas in accordance with their wavelength. $C_1$ indicates the curve of the dichroic filter which reflects the red rays (arrow $F_1$) lying within a band width of 6,000 to 7,000 A. and passes the whole complementary band of radiation lying to the left of curve $C_1$, that is to say the blue and green rays (from 4,000 to 6,000 A.). $C_2$ represents the curve of the dichroic filter which reflects the blue rays (arrow $F_2$) from 4,000 to 5,000 A. and passes the whole of the complementary wavelengths lying to the right of the curve $C_2$, that is to say the orange rays from 5,000 to 7,000 A.

The third beam which is neither reflected in the form of red or blue radiation passes through the filter which reflects the blue and the filter which reflects the red, that is to say, the beam between 5,000 and 6,000 A. The green monochromatic beam is thus represented in FIG. 5 between the curves $C_1$ and $C_2$.

Thus there are obtained three monochromatic optical beams of the same image and which do not vary from one another by an amount greater than that of the order of 1 micron, each of these beams occupying about a third of the visible light spectrum. However, the selectivity thus realized is not absolute and would have the same defects as the selectivity of the subtractive color emulsions, and would necessitate—at the stage of printing by offset duplication, heliography or by some other form of printing—a manual correction of the defects in the selectivity, (by retouching, masking, etc., which would deprive the method of its greatest advantage.

In order to render the various forms of retouching (optical, electronic or manual retouching) unnecessary, it must be ensured that there are three negatives or masters which have the benefits of a selectivity which is such that there is no overlap of the three passbands, the transmission and image density of these three masters being the same in all three cases. That is why the three secondary monochromatic beams, upon leaving the beam-splitting chamber which accommodates the two dichroic filters, are subjected to a further filtering action by the interferential filters so as to obtain the three curves of monochromatic transmission shown in FIG. 6.

To this end each of the second monochromatic beams passes through an interferential filter which has the purpose of:

1. reducing the passband in width, so that there will be no overlap between any two bands:
2. balancing the transmissions;
3. obtaining image densities on a photographic emulsion which are equal to each other and are a function of the chromatic sensitivity of this emulsion;
4. rendering equal the three refractive indices of the three transmission factors of the three optical paths described by the three monochromatic beams which form the three images.

Considering the above point 1, the red curve which is marked I.R. becomes highly selective. It clearly passes the infrared radiation, but this is of little importance because the film used is not sensitive to these wavelengths. The blue curve marked I.B. also becomes highly selective. It is clear that it passes the ultraviolet rays but, as in the case of the infrared radiation, the film used is insensitive to ultraviolet rays, so that these radiations are of small significance. The green curve marked I.V. should have the transmission curve shown in dashed line and indicated in FIG. 6 by $I_1V_1$, but as the sensitively of the film is weaker in the green wavelengths, it is necessary to widen the passband of the screen filter so as to make allowance for this and for obtaining on the film the continuous-line curve I.V. The sensitivity of the film is indicated in FIG. 6 by the chain dotted line marked as P. Although the curves obtained by means of the dichroic filters selected are the curves shown in the drawing by I.B., I.V. and I.R. the curves actually obtained in practice on the film are the three curves I.B., $I_1V_1$ and I.R. In order to obtain in practice curves exactly like those obtained by calculations, it is essential to use the interferential filters which are realized on the basis of the result which it is desired to obtain.

Regarding point 2 referred to above, the balance of the transmissions must be the same for the three monochromatic beams and must be a function of the width of the passband, of the chromatic sensitivity, of the emulsion and of the coefficient of absorption of the three optical paths described by the separate beams. Here this is realized by balancing the densities of the interferential filters, this balancing action being carried out, as a function of the transmission, by means of neutral grey filters which are deposited in vacuo. In this case only the red filter has received such treatment with a neutral grey filter of four percent absorption.

Concerning point 3 the exposure time and the diaphragms being identical for the three monochromatic beams and the passbands being determined once and for all by reasons of chromatic requirements, the balancing of the image densities is realized by the three luminance factors of the three beams as a function of the chromatic sensitivity of the film.

Concerning point 4, it is apparent that the red and blue beams upon passing through the dichroic, cross-shaped beam-splitting device, each pass through a thickness of glass according to an angle of incidence of 45° such that the effective distance through the glass is that corresponding to the thickness of the filter multiplied by / 2, that is to say by 1,414. The red and the blue beams each pass through 0.8 mm. × 1.414, whereas the green beam passes through two thicknesses of glass at the same angle, that is to say 1.6 mm. × 1.414. It is clearly necessary to make an allowance for this difference, and that is why the interferential filters are of different thicknesses. The red and blue interferential filters have a thickness of 2 mm., whereas the green interferential filter has a thickness of 1.13 mm.; this equalizes the three focal lengths, because the focal length or distance increases as a function of the thickness of the glass through which the respective beam passes.

It can thus be seen that all necessary precautions have been taken for the purpose of obtaining, from a polychromatic image, three monochromatic images which are strictly the same dimensionally, in their density and in their selectivity, these monochromatic images being formed on the same photographic film.

As a result of these precautions taken the three images can be used for making three masters for color printing, for example, without the necessity for any retouching; and the printed image obtained from these masters will be of a very high quality.

I claim:

1. Photographic apparatus for producing three monochromatic images on photosensitive surfaces, comprising two dichroic filters to split a polychromatic beam into three component monochromatic beams, three interference filters, each of which is placed in front of an associated photosensitive surface on which an image is to be formed by one of the monochromatic beams, an optical and image-recording portion formed by a homogeneous, nondeformable unit including means for positioning the various filters, and means for subjecting the filters to constant pressure, said filters being positioned with an accuracy of the order of a micron.

2. Apparatus according to claim 1, in which said optical unit is in the form of a cube, the dichroic filters being placed in cross formation inside the cube and the three interferential filters being arranged on three lateral faces of this cube, the means for positioning the dichroic filters comprising guides disposed on the inside of those faces of the cube, which extend at right angles to the filters, and the filters being laterally pressed against said guides under the action of a leaf spring and through the intermediary of angle elements.

3. Apparatus according to claim 2, in which said optical unit comprises a bottom cover plate and a top cover plate which are spaced from one another and interconnected by four upright columns, said guides being constituted by regions of increased thickness of the cover plates and being machined to an accuracy of 1 micron, and the angle elements being fixed to said cover plates in such manner that they can move in the direction of thrust exercised by said springs.

4. Apparatus according to claim 2, in which said cross formation of dichroic filters comprises a single filter and two half filters arranged diagonally in said cube, springs and spacing blocks being provided to exert tangential thrust on the outer edges of the filters, said springs acting to press said half filters from either side against the single filter and said spacing blocks being arranged to center the assembly of the cross formation with the accuracy of a micron.

5. Apparatus according to claim 4, in which the springs which exert a tangential pressure on the filters are arranged in longitudinal grooves machined in the upright columns which separate the lower and upper cover plates of the optical unit.

6. Apparatus according to claim 2, which is intended to be loaded with a film, said optical unit forming the film track along which the film is accurately guided, the three planes in which the three respective monochromatic images are formed being situated at the same distance from the optical center to the accuracy of a micron, whereby it is ensured that the three images will be strictly accurate from a mechanical point of view.

7. An apparatus for producing simultaneously three monochromatic images from a polychromatic ray comprising a first dichroic filter disposed at an angle to the polychromatic rays, said first dichroic filter being adapted to reflect rays of a first frequency range and to pass rays other than the rays of said first frequency range, a second dichroic filter disposed at an angle to the polychromatic rays, said second dichroic filter being adapted to reflect rays of a second frequency range, different from said first frequency range and to pass rays other than said second frequency range, a first interference filter positioned in the path of the rays reflected from said first dichroic filter, a second interference filter positioned in the path of the rays reflected from said second dichroic filter, and a third interference filter positioned in the path of the rays that pass through said first and said second dichroic filters, the rays passing through said third interference filter having frequency ranges other than the first and second frequency ranges, said dichroic and interference filters being effective to produce rays in three frequency ranges with the rays of the respective frequency ranges having luminous energy in direct proportion to the corresponding rays of the polychromatic ray.

8. An apparatus as set forth in claim 7 wherein the apparatus comprises a splitting block for a photographic camera for producing simultaneously on sensitive surfaces three monochromatic images from the polychromatic ray, the block including a framework in the form of a cube supporting the filters in a relationship to obtain on the sensitive surfaces placed behind the interference filters three monochromatic images, the passing spectral band of each splitted beam forming the image occupying ⅓ of the visible spectrum and being tangent to one another, means being provided for positioning the filters and the sensitive surface in the framework so that the optical paths of the three monochromatic beams are strictly identical, the thickness filters being placed crosswise in said framework.

9. An apparatus as set forth in claim 8, wherein the surface of at least one of the interference filters is provided with neutral grey layers in order to assure the balance of the luminous intensities of the three images as a function of the passing band, of the chromatic sensitivity of the sensitive surfaces and of the absorption factors of the optical paths.

10. An apparatus as set forth in claim 7, wherein the third interference filter is less thick than the two other interference filters, in order to render the focal lengths equal, the ratio of the thickness of said third interference filter to the thickness of the other interference filters being a function of the thickness of the two dichroic filters.

11. An apparatus as set forth in claim 8 wherein the means for positioning the dichroic filters comprises guides placed on the inside of those surfaces of the framework which extend at right angles to the filters, the filters being laterally pressed against these guides under the action of a leaf spring and through the intermediary of angle elements.

12. An apparatus as set forth in claim 11 wherein the framework comprises a bottom cover plate and a top cover plate which are spaced from each other and maintained in interconnection by four columns, said guides being of increased thickness in the cover plates and being machined to an accuracy of 1 micron, whereby the angle elements are fixed onto the cover plates in such a manner that they can move in the direction of thrust exerted by the springs.

13. An apparatus as set forth in claim 11 further including plate springs exerting a tangential thrust upon the outer edges of the dichroic filters to position the cross made by the dichroic filters in the optical center of the block.

14. An apparatus as set forth in claim 13 wherein the springs exerting a tangential pressure on the dichroic filters are placed in longitudinal grooves machined in the columns separating the bottom and the top cover plates of the optical block.

15. An apparatus as set forth in claim 12, in which the interference filters are maintained in slots provided at the lateral faces of the cube in the columns and in the bottom and top cover plates by means of the frames applied on each of the three faces of the cube.

16. An apparatus as set forth in claim 15, in which the sensitive surfaces are represented by a film, the frames retaining the interference filters forming at the same time a film track along which the film is accurately guided and maintained in place by means of press film, whereby the three formation planes of the three monochromatic images are situated at the same distance from the optical center to the accuracy of a micron, which permits a very strict identity on the mechanical plane of the three images.